United States Patent
De Meyer et al.

(10) Patent No.: US 6,405,763 B1
(45) Date of Patent: Jun. 18, 2002

(54) STRIP-SHAPED TEXTILE PRODUCT AND METHOD FOR THE PRODUCTION OF AN OBJECT REINFORCED WITH THE TEXTILE PRODUCT

(75) Inventors: Willy De Meyer, J.B. d'Hanedreef (BE); Michael Gilpatrick, Chesnee, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/039,730

(22) Filed: Jan. 4, 2002

Related U.S. Application Data

(62) Division of application No. 09/601,173, filed as application No. PCT/EP99/00628 on Feb. 1, 1999.

(30) Foreign Application Priority Data

Jan. 30, 1998 (DE) .......................................... 198 03 656

(51) Int. Cl.⁷ .............................. D03D 1/04; B32B 5/12; D01D 10/00; B60C 9/00
(52) U.S. Cl. .................. 139/389; 139/1 R; 139/383 R; 139/DIG. 1; 428/113; 264/173; 152/531
(58) Field of Search ................................. 139/1 R, 389, 139/DIG. 1, 383 R; 428/113; 264/173, 174; 152/531

(56) References Cited

U.S. PATENT DOCUMENTS

| 1,033,843 A | 7/1912 | Trautvetter | 139/DIG. 1 |
|---|---|---|---|
| 1,201,257 A | 10/1916 | Cobb | 139/DIG. 1 |
| 3,874,422 A | 4/1975 | Dow | 139/383 R |
| 4,055,697 A | 10/1977 | Schmanski | 428/113 |
| 4,191,219 A | 3/1980 | Kaye | 139/383 R |
| 4,887,656 A | 12/1989 | Verbauwhede et al. | 152/531 |
| 5,100,713 A | 3/1992 | Homma et al. | 428/102 |
| 5,224,519 A | 7/1993 | Farley | 139/DIG. 1 |
| 5,229,056 A | 7/1993 | DeMeyer et al. | 264/171.12 |
| 6,000,442 A | 12/1999 | Busgen | 139/389 |
| 6,164,339 A | 12/2000 | Greenhalgh | 139/1 R |

FOREIGN PATENT DOCUMENTS

| DE | 2626217 | 12/1977 |
|---|---|---|
| EP | 0250044 | 6/1987 |
| GB | 2117418 | 10/1983 |
| GB | 2159845 | 12/1985 |

OTHER PUBLICATIONS

European Patent Office, International Search Report for PCT/EP 99/00628, Jun. 1, 1999.

*Primary Examiner*—Amy Vanatta
*Assistant Examiner*—Robert H. Muromoto, Jr.
(74) *Attorney, Agent, or Firm*—Terry T. Moyer; Jeffery E. Bacon

(57) ABSTRACT

The weft threads (14) of a textile product (10) run at an angle of at least approximately 70 degrees with respect to its warp threads (12) and the weft threads (14) protrude, by a piece, beyond the outermost warp threads (12'), on at least one side of the strip-shaped textile product (10) in a strip-shaped textile product (10), consisting, in particular, of filaments, threads, or a yarn, for use as a reinforcement layer for hoses, tubes, pressure containers, and similar hollow objects. Alternately or in addition, the warp threads (12) are formed thinner than the remaining warp threads (12) in at least one boundary area (R) of the textile product (10).

42 Claims, 1 Drawing Sheet

Figure 1:
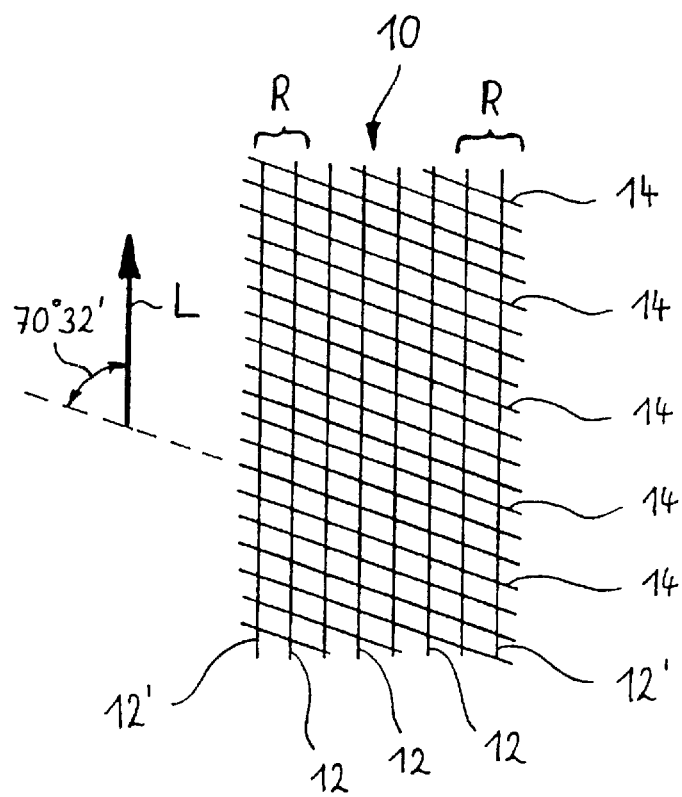

STRIP-SHAPED TEXTILE PRODUCT AND METHOD FOR THE PRODUCTION OF AN OBJECT REINFORCED WITH THE TEXTILE PRODUCT

This application is a divisional of U.S. Ser. No. 09/601,173, with a filing date of Jul. 28, 2000, and currently pending, which claims priority to international application PCT/EP99/00628, filed on Feb. 1, 1999, which claims priority to German Patent Application Number DE 198 03 656.6, filed on Jan. 30, 1998. Applicants hereby claim priority to each of these prior applications, and incorporates the contents of those applications and the filed histories of each of those applications by specific reference thereto.

The invention refers to a strip-shaped textile product, in particular, consisting of filaments, threads, or yarn, for use as a reinforcement layer for hoses, tubes, pressure containers, and similar objects, in accordance with the preamble of claim 1, and method for the production of a hose, tube, pressure container, or a similar object, reinforced with the textile product.

Methods are generally known for increasing the strength (in particular, the bursting pressure is meant here) of a hose, tube, pressure container, or a similar hollow object in that the wall of the object is provided with a layer of reinforcement material. Usually, this reinforcement layer is a textile product, for example, one or more screw-shaped, wound threads or also fabric inserts. The application of such reinforcement inserts is time- and labor-consuming. If only one reinforcement layer is applied, the desired reinforcement effect is not attained because of the anisotropic characteristics of the used textile products, so that frequently, at least two, and often also more reinforcement layers are applied on the wall of the object.

The goal of the invention is to indicate a textile product suitable for use as a reinforcement layer, which is simple to produce and which can produce a clearly improved reinforcement effect, in comparison to traditionally used textile products. Moreover, the goal of the invention is to indicate a method with which, in a simple manner and with the use of the prepared textile product, a hose, a tube, a pressure container, or a similar hollow object can be reinforced effectively and at low cost.

On the basis of a generic, strip-shaped textile product with a warp direction, running in the longitudinal direction of the textile product, and a weft direction, this goal is attained in that the weft of the textile product runs at an angle of at least approximately 70 degrees with respect to the warp, and that at least on one side of the strip-shaped textile product, the weft sticks out, by a piece, beyond the lateral warp. "Warp" and "weft" are understood to mean here the totality of the warp threads or yarns or filaments or the weft threads or yarns or filaments—that is, the entire warp structure or weft structure of the textile product.

By having the weft, in accordance with the invention, run at an angle of at least approximately 70 degrees (70°32' are optimal) with respect to the warp and having a piece, at least on one side, project far beyond the outermost border of the warp, such a strip-shaped textile can be applied on an object which is to be reinforced in a manner which is optimal with regard to the reinforcement effect. The weft of the textile product, in accordance with the invention, running at an angle of at least and approximately 70 degrees with respect to the warp, makes it thereby possible to apply the textile product on the object to be reinforced in such a way that both the warp and also the weft of the textile product, in accordance with the invention, run at an angle of precisely 55 degrees with respect to the longitudinal direction of the hollow object to be reinforced. This angle, which, in the literature is frequently indicated also with regard to a direction perpendicular to the longitudinal direction and then is somewhat more than 35 degrees (in the optimal case 35°16'), is also known as the so-called neutral angle. "Approximately 70 degrees" within the scope of the application under consideration is understood to mean that the angle need not be precisely 70 degrees, but rather can lie in a range of, for example, 60–80 degrees. What is basically valid is that the reinforcing effect of the textile product, in accordance with the invention, is all the worse after the application on an object to be reinforced, the more the angle differs from the optimal value of 70°32', because then the warp and the weft can no longer run at the aforementioned optimal angle of precisely 55 degrees. However, for certain application cases, it may be advantageous to design the textile product, in accordance with the invention, in such a way that the angle of approximately 55 degrees is established only when the object to be reinforced with the textile product, in accordance with the invention, is under an interior pressure load, as it usually occurs in the operation of the pertinent object. This can mean that the weft of the textile product, in accordance with the invention, runs at an angle, in the unstressed state, which more or less clearly differs from 70 degrees.

The weft of the textile product, in accordance with the invention, which projects, at least on one side, by a piece, beyond the outermost warp—when the textile product is wound on the body to be reinforced—leads to a better binding of the boundary areas of the textile product, among one another, which overlap during winding. Moreover, the protruding weft pieces of the textile product, in accordance with the invention, find a good support in the matrix, which surrounds the textile product in the finished state of the reinforced object. In this way—that is, through the better binding of the individual windings, among one another, in the weft direction, and by the better anchoring of the weft in the matrix, the textile product, in accordance with the invention, has practically the same good reinforcement characteristics not only in the warp direction, but also in the weft direction.

According to one alternative of the textile product, in accordance with the invention, the weft runs at an angle of at least and approximately 70 degrees with respect to the warp, and the warp structure is designed thinner in one boundary area—at least on one side of the textile product—than the rest of the warp structure. This opens up the possibility of allowing the corresponding boundary area to overlap with the next axially following winding, during the winding on a body to be reinforced, without increasing the total thickness of the reinforcement layer in the overlapping area. Analogous to the laterally protruding weft pieces, the overlapping of the boundary areas with the more thinly designed warp structure leads to a better binding of the individual windings, among one another, in the weft direction and to a better anchoring of the critical overlapping area from one winding to the next in the matrix and thus to similarly good strength characteristics, as the first-mentioned alternative of the textile product, in accordance with the invention.

Advantageously, the two alternatives can also be combined—that is, on at least one side of the strip-shaped textile product in one boundary area, the warp structure is designed more thinly than the remaining warp structure, and the weft sticks out, by a piece, beyond the outermost warp on this side (and/or on the other side). The strength characteristics and thus the reinforcement effect of the textile product, in accordance with the invention, can be improved, once more, in this way.

In a further development of the textile product, in accordance with the invention, the warps or the warp structure are/is made of another material than the remaining warp structure on at least one side of the textile product in one boundary area. Thus, for example, in spite of a thinner warp structure, a tensile strength corresponding to the remaining warp structure can also be obtained in the boundary area.

In preferred embodiments, the strip-shaped textile product, in accordance with the invention, is a scrim product. Scrim products are particularly advantageous for the indicated purpose, since no cutting of the warp structure into the weft structure and vice-versa takes place. Therefore, a weakening of the individual structures at the intersection points is avoided with a scrim product. In addition, the required, scrim-product fixing matrix provides for a separation of the individual threads, filaments, or yarns from one another. Moreover, a scrim product can be produced very quickly and thus at low cost. Instead of a scrim product, the textile product, in accordance with the invention, however, can also be a woven fabric or a knitted product, or something similar.

The method, in accordance with the invention, is characterized, by the step of the winding of a previously described textile product onto a core of a hose, tube, pressure container, or a similar hollow object. The winding is thereby undertaken in such a way that the warp or the warp structure of the textile product runs at an angle of at least approximately 55 degrees with respect to the longitudinal direction of the object to be reinforced and that the weft pieces, which protrude beyond the outermost warp, and/or the boundary areas of the strip-shaped textile product, adjacent to one another and in which the warp structure is thinner than the rest of the warp structure, overlap. As was already explained, both the warp direction and the weft direction of a textile product, in accordance with the invention, then run at an angle, which is optimal from a perspective of strength, and is at least approximately 55 degrees with respect to the longitudinal direction (35 degrees with respect to the transverse direction) of the object to be reinforced, wherein in an interplay with the better-anchored boundary areas of the strip-shaped textile product, which are better bound with one another, an excellent reinforcement effect is attained with only one single layer. In contrast to the two reinforcement layers previously required for such a reinforcement, a winding station can be dispensed with in the production of, for example, a hose, which is reinforced with a textile product in accordance with the invention.

In a modification of the method in accordance with the invention, the textile product is wound on the object to be reinforced, so that the angle of at least approximately 55 degrees with respect to the longitudinal direction of the object to be reinforced is established only under the interior pressure load common in the operation of the pertinent object. This means that during the wrapping of the object to be reinforced, the warp of the textile product does not yet run at the desired angle of approximately 55 degrees with respect to the longitudinal direction of the object to be reinforced.

In order to bring the textile product used for the reinforcement into a good, load-carrying bonding with the object to be reinforced, the textile product, in accordance with one development of the method in accordance with the invention, is wound on a layer of soft matrix material which is later reinforced, however. The textile product then enters into the desired, close bond with the matrix material.

In accordance with one alternative, the textile product can also be wound on the aforementioned core first (for example, an interior layer) of the object to be reinforced and subsequently, a layer of a soft matrix material, which is reinforced later, is brought onto the textile product.

In accordance with another alternative, the textile product itself can contain the matrix material already, so that by increasing the temperature, which leaves the rest of the textile product unchanged, the matrix material becomes soft and in the course of a later cooling, which takes place on the aforementioned core after the application on the textile product, is again reinforced. With the last-mentioned development, the matrix material can be part of a thread or yarn of the textile product. For example, the used threads can consist of two components, of which one component is the matrix material and the second component, the carrying material. Likewise, yarns consisting of various threads or fibers can be used, wherein, in turn, certain threads or fibers take over the carrying function and other threads or fibers prepare the matrix material.

If the discussion in the preceding has been of a matrix material, which is reinforced later, then depending on the application case, this can mean that the matrix material is rigid (for example, in the production of reinforced tubes); it can, however, also mean that the matrix material becomes solid but remains elastic thereby (for example, in the production of flexible hoses). The matrix material can coincide with the material of which the object to be reinforced is made (for example, with hoses or tubes made of plastic), or it can be another material.

Figure 2:
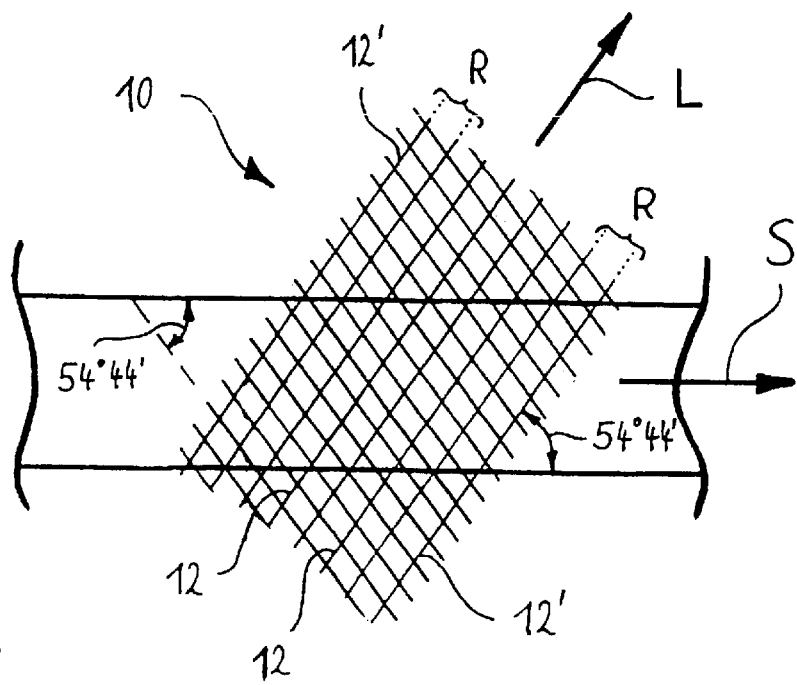

For a better explanation of the invention, reference is made below to two figures, of which:

FIG. 1 shows an exemplified embodiment of a textile product, in accordance with the invention; and FIG. 2 shows the textile product from FIG. 1 while it is being wound on a tube.

FIG. 1 shows a section of a strip-shaped textile product 10, formed here as a scrim product, with warp threads 12 and weft threads 14, running in the longitudinal direction L. As shown, the weft threads 14 run at an angle of 70°32' with respect to the longitudinal direction L and thus to the warp threads 12.

The weft threads 14 project, by a piece, beyond the outermost warp threads 12' on both sides of the textile product 10. In actual practice, this lateral projection is on the order of magnitude of at least approximately one millimeter and depends on the required bursting pressure. The higher the desired bursting pressure is, the greater must be the lateral projection, so as to attain a sufficient loadable adhesion of the textile product in the matrix surrounding it in the lower overlapping areas described, between two windings also.

In one boundary area R of the textile product, which comprises two warp threads 12 here, the warp threads 12 are made thinner than the other warp threads 12. While being wound on an object to be reinforced, the boundary area R can then overlap with the boundary area R of a winding which follows axially, without the total thickness of the reinforcement layer formed by the textile product 10 differing in the overlapping area from the thickness of the textile product in nonoverlapped areas—that is, without there being thickness changes of the reinforcement layer along the object to be reinforced.

From FIG. 2, one can see how the textile product 10 depicted in FIG. 1 is to be wound around an object to be reinforced—in this case, a tube. With reference to the longitudinal direction S of the tube, the textile product 10 is wound on an interior layer 16 of the tube in such a way that the warp threads 12 run at an angle of 54°44' with respect to the longitudinal direction S. Automatically, the weft threads 14 are then also at an angle of 54°44' with respect to the longitudinal axis S of the tube and is thus arranged at an angle which is optimal with regard to the reinforcing effect. On the basis of the windings which overlap in the boundary area R of the textile product 10, the reinforcement in the weft direction, attained by the textile product 10, is practically as high as in the warp direction.

What is claimed is:

1. A method comprising the steps of:
   a) providing an elongated tubular pressure container having a container longitudinal direction;
   b) providing a strip-shaped textile product having a textile longitudinal direction and a cross direction, the strip-shaped textile product including:
      warp members running in the longitudinal direction with a first extreme warp member and a second extreme warp member defining the outer limits of the warp members, the weft members having a first outer boundary region with the first extreme outer warp member defining the outermost limit of the first outer boundary region, a second outer boundary region with the second outer warp member defining the outermost limit of the second outer boundary region, and a middle region disposed between the first outer boundary region and the second outer boundary region;
      weft members running at an angle of from 60 to 80 degrees with respect to the warp members, wherein the weft members project beyond the first extreme warp member; and
   c) wrapping the strip shaped textile product around the elongated tubular pressure container such that the warp members of the strip shaped textile run at an angle of at least about 55 degrees from the container longitudinal direction and the first outer boundary region and the second outer boundary region of the warp members overlapping.

2. The method according to claim 1, wherein the step of providing the strip-shaped textile member includes the weft members projecting beyond the second extreme warp member.

3. The method according to claim 1, further including the step of placing a matrix material on the elongated tubular pressure chamber prior to the step of wrapping the strip-shaped textile product around the elongated tubular pressure chamber.

4. The method according to claim 3, further including the steps of:
   heating the elongated tubular pressure chamber with the matrix material and the strip-shaped textile product thereon; and
   cooling the elongated tubular pressure chamber after the step of heating the elongated tubular pressure member.

5. The method according to claim 1, further including the step of placing a matrix material on the elongated tubular pressure chamber after the step of wrapping the strip-shaped textile product around the elongated tubular pressure chamber.

6. The method according to claim 5, further including the steps of:
   heating the elongated tubular pressure chamber with the strip-shaped textile product and the matrix material; and
   cooling the elongated tubular pressure chamber after the step of heating the elongated tubular pressure member.

7. The method according to claim 1, wherein the step of providing the strip-shaped textile product includes the strip shaped textile including a matrix material.

8. The method according to claim 7, further including the steps of:
   heating the elongated tubular pressure chamber with the strip-shaped textile product thereon; and
   cooling the elongated tubular pressure chamber after the step of heating the elongated tubular pressure member.

9. The method according to claim 1, wherein the step of providing the strip-shaped textile product includes the warp members and the weft members including a matrix material.

10. The method according to claim 9, further including the steps of:
    heating the elongated tubular pressure chamber with the strip-shaped textile product thereon; and
    cooling the elongated tubular pressure chamber after the step of heating the elongated tubular pressure member.

11. The method according to claim 1, wherein the step of providing a strip-shaped textile includes the weft members running at 70°32' with respect to the warp members.

12. The method according to claim 1, wherein the step of providing a strip-shaped textile includes the warp members in the first boundary region being thinner than the warp members in the middle region.

13. The method according to claim 12, wherein the step of providing the strip-shaped textile member includes the warp members in the first boundary region are a different material than the warp members of the middle region.

14. The method according to claim 13, wherein step of providing the strip-shaped textile product includes the warp members in the first boundary region have a tensile strength corresponding to the tensile strength of the warp members in the middle region.

15. The method according to claim 12, wherein the step of providing the strip-shaped textile product includes the warp members in the second boundary region being thinner than the warp members in the middle region.

16. The method according to claim 15, wherein the step of providing the strip-shaped textile member includes the warp members in the first boundary region and the second boundary region are a different material than the warp members of the middle region.

17. The method according to claim 16, wherein step of providing the strip-shaped textile product includes the warp members in the first boundary region and the second boundary region have a tensile strength corresponding to the tensile strength of the warp members in the middle region.

18. The method according to claim 15, wherein the step of providing the strip-shaped textile product includes the combined thickness of the strip-shaped textile product in the first outer boundary region and the second outer boundary region is not more than the thickness of the strip-shaped textile product in the middle region.

19. The method according to claim 1, wherein the step of providing the strip-shaped textile product includes the strip-shaped textile member being a textile selected from the group consisting of woven, knit, and scrim.

20. The method according to claim 1, wherein the step of wrapping the strip-shaped textile product around the elongated tubular pressure container includes wrapping the strip-shaped textile member around the elongated tubular pressure container such that the warp members of the strip-shaped textile product run at an angle of at least 35° from a perpendicular line with respect to the pressure container longitudinal direction.

21. The method according to claim 1, wherein the step of wrapping the strip-shaped textile product around the elongated tubular pressure container includes wrapping the strip-shaped textile member around the elongated tubular pressure container such that the warp members of the strip-shaped textile product run at an angle of about 55° from the pressure container longitudinal direction.

22. A method comprising the steps of:
    a) providing an elongated tubular pressure container having a container longitudinal direction;

b) providing a strip-shaped textile product having a textile longitudinal direction and a cross direction, the strip-shaped textile product including:

warp members running in the longitudinal direction with a first extreme warp member and a second extreme warp member defining the outer limits of the warp members, the weft members having a first outer boundary region with the first extreme outer warp member defining the outermost limit of the first outer boundary region, a second outer boundary region with the second outer warp member defining the outermost limit of the second outer boundary region, and a middle region disposed between the first outer boundary region and the second outer boundary region;

weft members running at an angle of from 60 to 80 degrees with respect to the warp members, wherein the weft members project beyond the first outer boundary region and the first extreme warp member such that the weft members do not remain in contact with the first extreme warp member beyond the first boundary region; and c) wrapping the strip shaped textile product around the elongated tubular pressure container such that the warp members of the strip shaped textile run at an angle of at least about 55 degrees from the container longitudinal direction and the first outer boundary region and the second outer boundary region of the warp members overlapping.

23. The method according to claim 22, wherein the step of providing the strip-shaped textile member includes the weft members projecting beyond the second outer boundary region and the second extreme warp member such that the weft members do not remain in contact with the second extreme weft member beyond the second outer boundary region.

24. The method according to claim 22, further including the step of placing a matrix material on the elongated tubular pressure chamber prior to the step of wrapping the strip-shaped textile product around the elongated tubular pressure chamber.

25. The method according to claim 24, further including the steps of:

heating the elongated tubular pressure chamber with the matrix material and the strip-shaped textile product thereon; and cooling the elongated tubular pressure chamber after the step of heating the elongated tubular pressure member.

26. The method according to claim 27, further including the step of placing a matrix material on the elongated tubular pressure chamber after the step of wrapping the strip-shaped textile product around the elongated tubular pressure chamber.

27. The method according to claim 26, further including the steps of:

heating the elongated tubular pressure chamber with the strip-shaped textile product and the matrix material; and cooling the elongated tubular pressure chamber after the step of heating the elongated tubular pressure member.

28. The method according to claim 22, wherein the step of providing the strip-shaped textile product includes the strip shaped textile including a matrix material.

29. The method according to claim 28, further including the steps of:

heating the elongated tubular pressure chamber with the strip-shaped textile product thereon; and cooling the elongated tubular pressure chamber after the step of heating the elongated tubular pressure member.

30. The method according to claim 28, wherein the step of providing the strip-shaped textile product includes the warp members and the weft members including a matrix material.

31. The method according to claim 30, further including the steps of:

heating the elongated tubular pressure chamber with the strip-shaped textile product thereon; and cooling the elongated tubular pressure chamber after the step of heating the elongated tubular pressure member.

32. The method according to claim 22, wherein the step of providing a strip-shaped textile includes the weft members running at 70° 32' with respect to the warp members.

33. The method according to claim 22, wherein the step of providing a strip-shaped textile includes the warp members in the first boundary region being thinner than the warp members in the middle region.

34. The method according to claim 33, wherein the step of providing the strip-shaped textile member includes the warp members in the first boundary region are a different material than the warp members of the middle region.

35. The method according to claim 34, wherein step of providing the strip-shaped textile product includes the warp members in the first boundary region have a tensile strength corresponding to the tensile strength of the warp members in the middle region.

36. The method according to claim 33, wherein the step of providing the strip-shaped textile product includes the warp members in the second boundary region being thinner than the warp members in the middle region.

37. The method according to claim 36, wherein the step of providing the strip-shaped textile member includes the warp members in the first boundary region and the second boundary region are a different material than the warp members of the middle region.

38. The method according to claim 37, wherein step of providing the strip-shaped textile product includes the warp members in the first boundary region and the second boundary region have a tensile strength corresponding to the tensile strength of the warp members in the middle region.

39. The method according to claim 36, wherein the step of providing the strip-shaped textile product includes the combined thickness of the strip-shaped textile product in the first outer boundary region and the second outer boundary region is not more than the thickness of the strip-shaped textile product in the middle region.

40. The method according to claim 22, wherein the step of providing the strip-shaped textile product includes the strip-shaped textile member being a textile selected from the group consisting of woven, knit, and scrim.

41. The method according to claim 22, wherein the step of wrapping the strip-shaped textile product around the elongated tubular pressure container includes wrapping the strip-shaped textile member around the elongated tubular pressure container such that the warp members of the strip-shaped textile product run at an angle of at least 35° from a perpendicular line with respect to the pressure container longitudinal direction.

42. The method according to claim 22, wherein the step of wrapping the strip-shaped textile product around the elongated tubular pressure container includes wrapping the strip-shaped textile member around the elongated tubular pressure container such that the warp members of the strip-shaped textile product run at an angle of about 55° from the pressure container longitudinal direction.

\* \* \* \* \*